E. H. R. BARTON.
SPEED CHANGING MECHANISM.
APPLICATION FILED MAR. 18, 1907.

942,192.

Patented Dec. 7, 1909

WITNESSES:
Howard G Boardman.
J. Bird Peale Green

Edward H. R. Barton INVENTOR

UNITED STATES PATENT OFFICE.

EDWARD H. R. BARTON, OF ENGLEWOOD, NEW JERSEY, ASSIGNOR OF ONE-HALF TO RAYMOND CARPENTER, OF HACKENSACK, NEW JERSEY.

SPEED-CHANGING MECHANISM.

942,192.  Specification of Letters Patent.  Patented Dec. 7, 1909.

Application filed March 18, 1907. Serial No. 363,150.

*To all whom it may concern:*

Be it known that I, EDWARD H. R. BARTON, a citizen of the United States, residing at Englewood, in the county of Bergen and State of New Jersey, have invented a new and useful Speed-Changing Mechanism, of which the following is a specification.

My invention relates to a new speed changing mechanism in which the speed of the driven member bears no fixed ratio to the speed of the driver, but is either maintained constant automatically or may be varied at the will of the operator. I attain these objects by the mechanism illustrated in the accompanying drawing, in which—

Figure 2:
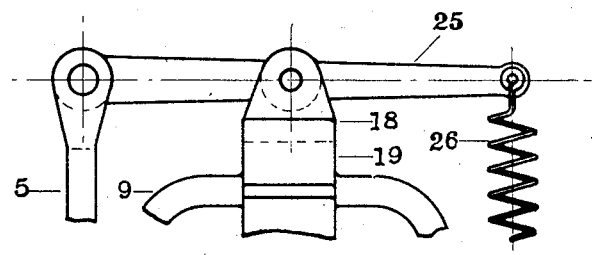
Figure 1:
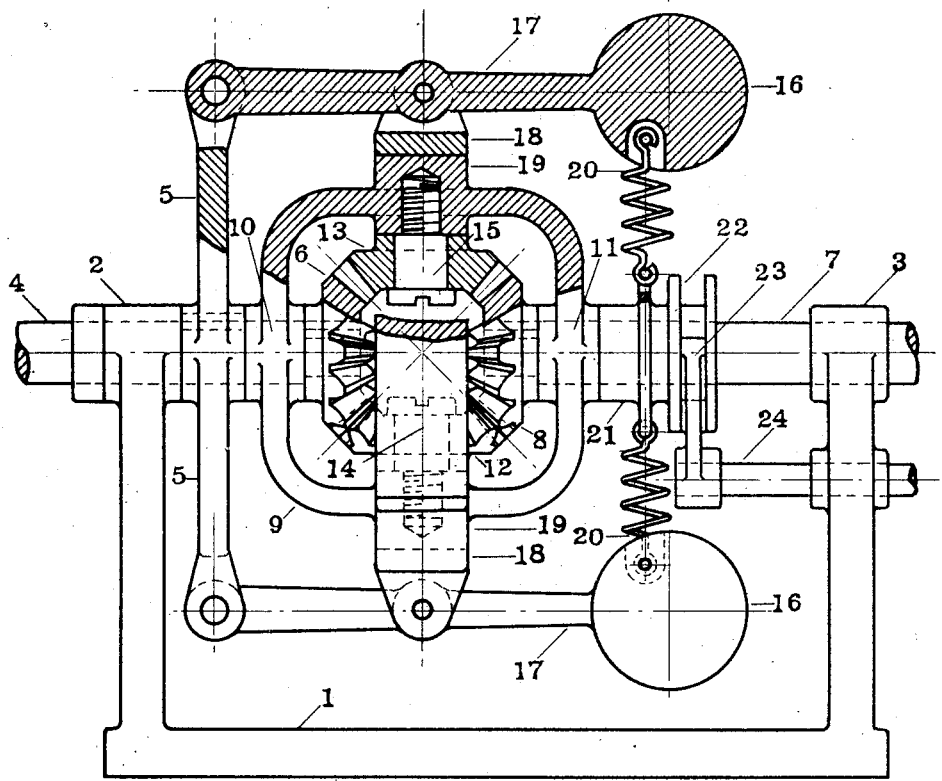

Figure 1 represents a machine for automatically maintaining a driven shaft at constant speed regardless of the speed of the driver; and Fig. 2 represents a variation by means of which the machine is converged into a change gear having an unlimited number of speed ratios and operated manually.

Similar characters refer to similar parts in both figures.

In the drawing, 1 is the framework supporting the main bearings 2 and 3.

4 is the driven shaft and to it are fastened the arms 5—5 and the bevel gear 6.

7 is the driving shaft to which is fastened the bevel gear 8.

The cage 9, which is shown partly in section, is supported on the two shafts 4 and 7 at the bearings 10 and 11 respectively, but is free to turn on them. The bevel gears 12 and 13 are mounted on screws 14 and 15 respectively, which are screwed into opposite sides of cage 9. These bevel gears are free to turn on the screws: their teeth mesh with those of gears 6 and 8. Governor weights 16—16, mounted on the ends of levers 17—17, are pivoted to arms 5—5. To the levers 17—17, are pivoted friction shoes 18—18. These shoes bear on the outer surface of the ring 19 which forms a part of cage 9. The weights 16—16 are held together against the action of centrifugal force, by springs 20—20 attached to collar 21. This collar is free to turn on shaft 7. It has a groove 22 which is engaged by yoke 23, carried on the end of sliding rod 24, by means of which the collar 21 may be slid along on the shaft 7, thus tightening the springs 20—20.

The levers 25—25, shown in Fig. 2, which may be used instead of levers 17—17 (Fig. 1) are so light that the effect of centrifugal force on them may be neglected. They are connected to collar 21 by springs 26—26.

The operation of this mechanism to automatically maintain a constant speed of the driven shaft will be explained by reference to Fig. 1. When the apparatus is at rest, the springs 20—20 pull the shoes 18—18 hard against the ring 19, locking them together. When the driving shaft 7 begins to turn, gear 8 attached to it tends to rotate gears 12 and 13 on their axes. But if gears 12 and 13 rotate, they will act on gear 6 to cause themselves, and case 9 which carries them, to rotate with respect to gear 6 and shaft 4 and arms 5—5, levers 17—17 and shoes 18—18, connected to shaft 4. But, since shoes 18—18 and ring 19 are locked together, case 9 can rotate only at the same speed as shaft 4. Therefore, gears 12 and 13 cannot turn on their axes and shaft 4 must rotate at the same speed as shaft 7, under the conditions supposed. As the speed of the shafts increases, the centrifugal force of the weights 16—16 reduces the pressure of the shoes 18—18 on the ring 19. When the speed of shaft 4 passes that for which the governor has been set, the shoes release the ring, thus allowing the gears to turn upon each other and the case 9 to rotate faster than shaft 4. If it were possible for the shoes to release the ring entirely, the gears 12 and 13 would cease to drive gear 6 and shaft 4, and case 9 would rotate at one-half the speed of shaft 7. But, as soon as the speed of shaft 4 falls below normal, the governor springs 20—20 act and cause the shoes 18—18 to increase their pressure upon ring 19 and by retarding case 9, cause the gears to increase the driving force on shaft 4. Thus the gear reduction is automatically brought to a ratio that will result in a constant speed of the driven shaft 4, no matter how much faster the driving shaft 7 may go, or how much its speed may vary.

The governor may be set to operate at different speeds by varying the tension of the springs 20—20. This is accomplished by moving the collar 21 back and forth on shaft 7 by means of fork 23 which engages groove 22 and is carried by sliding rod 24.

If levers 25—25 (Fig. 2) are substituted for levers 17—17, the speed ratio between the driven and the driving shafts depends only upon the pressure of the shoes 18—18 upon the ring 19, which in turn depends upon the tension maintained in the springs 26—26 by the adjustment of the collar 21 on the shaft 7.

I am aware that prior to my invention, speed changing gears have been made in which the speed ratio between the driven and the driving shafts is fixed by controlling the actual speed of some intermediate gear or gears.

I do not desire to be limited to the disclosure that has been made in this case; but What I claim as my invention, and desire to secure by Letters Patent, is—

1. In a speed changing mechanism, a driven member, a driving member, an intermediate member connected to the driven and the driving members and other means to connect and to cause the driven member and the intermediate member to react upon each other and thereby determine the speed of the driven member, substantially as set forth.

2. In a speed changing mechanism, a driven member, a driving member, an intermediate member connected to the driven and the driving members, other means to connect and to cause the driven member and the intermediate member to react upon each other and means to vary the said reaction between the said driven and intermediate members and thereby control the speed of the driven member, substantially as set forth.

3. In a speed changing mechanism, a driven member, a driving member, an intermediate member connected to the driven and the driving members, other means to connect and to cause the driven member and the intermediate member to react upon each other and means to automatically vary the reaction between the said driven and intermediate members and thereby automatically control the speed of the driven member substantially as set forth.

4. In a speed changing mechanism, a driven member, a driving member, an intermediate member connected to the driven and the driving members, other means to connect and to cause the driven member and the intermediate member to react upon each other and a governor to automatically vary the said reaction between the said driven and intermediate members and thereby automatically control the speed of the driven member, substantially as set forth.

5. In a speed changing mechanism, a driven member, a driving member, an intermediate member, means to cause the driven member and the intermediate member to react upon each other and a governor connected to the driven member to automatically vary the reaction between the said driven and intermediate members and thereby automatically control the speed of the driven member, substantially as set forth.

6. In a speed changing mechanism, a driven member, a driving member, an intermediate member, a slipping-friction clutch between the driven member and the intermediate member and a governor to automatically operate the said slipping friction clutch and thereby automatically control the speed of the driven member, substantially as set forth.

7. In a speed changing mechanism, the combination of a driven shaft, a driving shaft, a train of gears connecting them, a slipping friction clutch between the driven shaft and the train of gears and means to automatically operate said clutch, substantially as, and for the purposes set forth.

8. In a speed changing mechanism, the combination of a driven shaft, a driving shaft, a differential gear connecting them, a slipping friction clutch between the driven shaft and the differential gear and means to automatically operate said clutch, substantially as, and for the purposes set forth.

9. In a speed changing mechanism, the combination of a driven shaft, a driving shaft, a train of gears connecting them, a slipping friction clutch between the driven shaft and the train of gears and a governor mounted on the driven shaft and designed to operate the said clutch, substantially as, and for the purposes set forth.

10. In a speed changing mechanism, the combination of a driven shaft, a driving shaft, a differential gear connecting them, a slipping friction clutch between the driven shaft and the differential gear and a governor mounted on the driven shaft and designed to operate the said clutch, substantially as, and for the purposes set forth.

11. In a speed changing mechanism, the combination of a driven shaft, a driving shaft, a train of gears connecting them, a slipping friction clutch between the driven shaft and the train of gears, a governor mounted on the driven shaft and designed to operate the said clutch and means to adjust the said governor for different speeds of the driven shaft, substantially as, and for the purposes set forth.

12. In a speed changing mechanism, the combination of a driven shaft, a driving shaft, a differential gear connecting them, a slipping friction clutch between the driven shaft and the differential gear, a governor mounted on the driven shaft and designed to operate the said clutch and means to adjust the said governor for different speeds of the driven shaft, substantially as, and for the purposes set forth.

13. In a speed changing mechanism, the combination of a driven shaft, a driving shaft and connecting them a differential gear having an annular bearing surface, with a slipping friction clutch consisting of a shoe or shoes which rotate with the driven shaft and bear upon the said annular surface on the differential gear and a governor connected to the driven shaft, which controls the pressure of the said shoe or shoes upon the said annular surface, substantially as, and for the purposes set forth.

14. In a speed changing mechanism, the combination of a driven shaft, a driving shaft and a differential gear connecting them, with a slipping friction clutch between the driven shaft and the differential gear and a governor consisting of a weight or weights mounted upon and rotating with the driven shaft, which operate to release the said clutch as they fly out under the influence of centrifugal force, and a spring or springs which oppose the action of centrifugal force upon the weight or weights and tend to close the said clutch as the weight or weights are drawn in, substantially as, and for the purposes set forth.

In testimony whereof I have signed my name to this specification in the presence of two subscribing witnesses.

EDWARD H. R. BARTON.

Witnesses:
   Geo. A. Horne,
   C. P. Quirin.